Nov. 3, 1970 L. W. PARKER 3,538,245
INTERCARRIER TELEVISION SYSTEMS WITH CANCELLATION OF AMPLITUDE MODULATION IN THE INTERCARRIER SOUND SIGNAL
Filed July 24, 1968
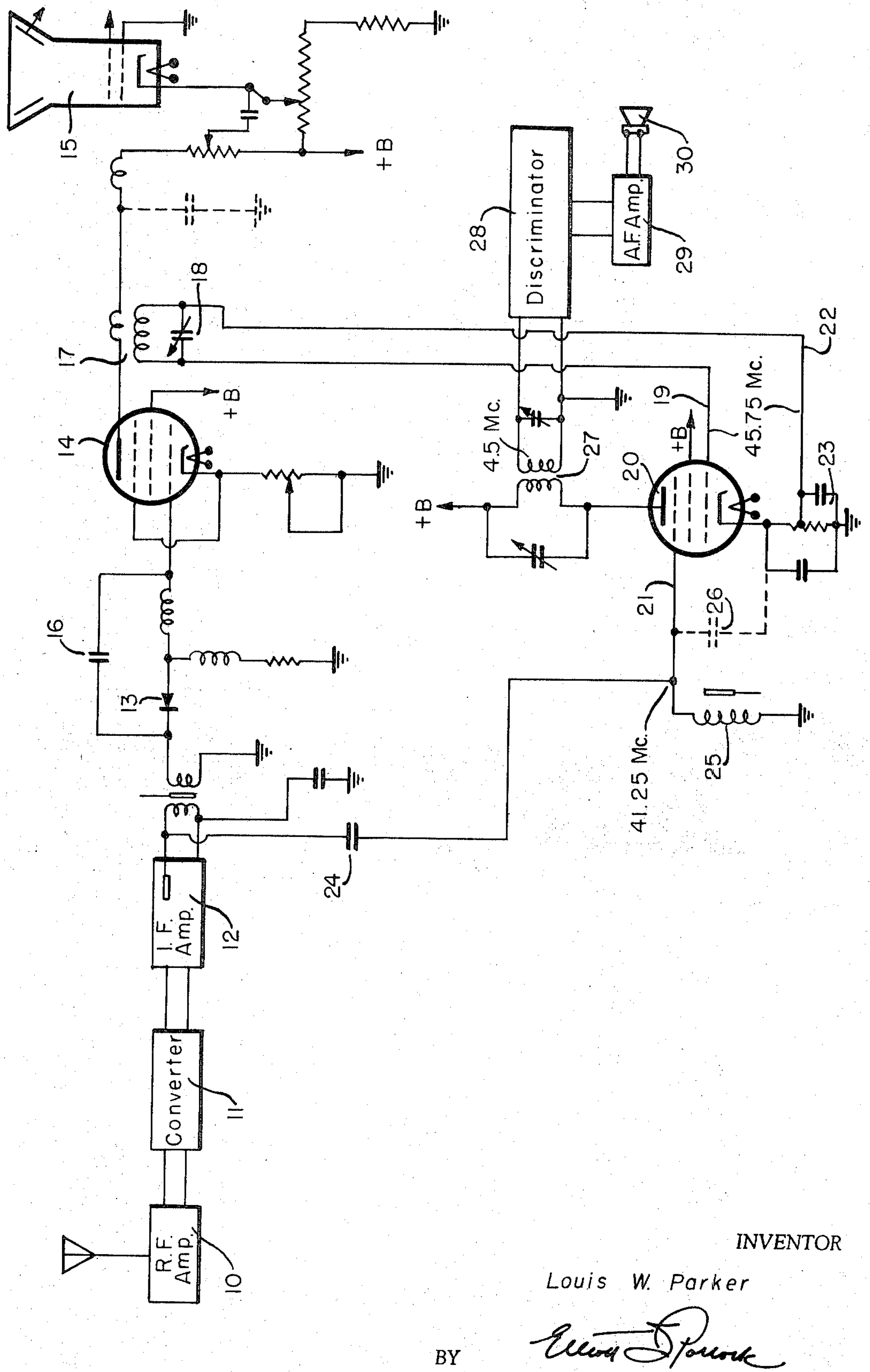
INVENTOR
Louis W. Parker
BY [signature]
ATTORNEY 3,538,245

INTERCARRIER TELEVISION SYSTEMS WITH CANCELLATON OF AMPLITUDE MODULATION IN THE INTERCARRIER SOUND SIGNAL

Louis W. Parker, 2040 N. Dixie Highway, Fort Lauderdale, Fla. 33305

Filed July 24, 1968, Ser. No. 747,332
Int. Cl. H04n 5/62
U.S. Cl. 178—5.8 8 Claims

ABSTRACT OF THE DISCLOSURE

In an intercarrier system, the separated picture and sound I.F. carriers are applied respectively to different control electrodes of a mixer stage, which control electrodes are operated in a non-linear fashion; and the F.M. sound carrier is then taken from the mixer stage by a tuned circuit and fed to a discriminator.

BACKGROUND OF THE INVENTION

Principles of intercarrier sound systems are well known in the art, one description of them being given in my prior U.S. Pat. No. 2,448,908. In such a system, a predetermined difference frequency is provided between the picture and sound carriers, with this frequency being, according to present standards, 4.5 mc. This difference frequency is often termed the "intercarrier frequency" and, in well known manner, provides the sound signal which is applied to an appropriate discriminator in the television receiver circuit.

Various circuits have been suggested heretofore for deriving the intercarrier sound signal. Many of these arrangements are such, however, than an audible buzzing sound is produced in the background of the audible portion of the television program. The main reason for the occurrence of this buzzing sound is the amplitude modulation appearing on the frequency modulated 4.5 mc. carrier which is applied to the frequency discriminator in the receiver. It is a major object of the present invention to reduce the amplitude modulation which may otherwise appear on the frequency modulated intercarrier sound signal, thereby to reduce the aforementioned buzzing sound.

Known television receivers use a detector stage coupled to the output of the I.F. amplifier to produce the intercarrier sound signal as if the signal were one of the side bands. As such, when going through the detection process with all the other side bands, a sound signal is produced which is equal in frequency to the frequency difference between the sound I.F. and the picture I.F. carriers. Inasmuch as the picture carrier amplitude may be diminished at times by the picture side bands, there will be times when the picture carrier amplitude is not much greater than the sound I.F. signal amplitude. This will result in a momentary dropping of the intercarrier signal amplitude.

As is discussed in my prior Pat. No. 2,448,908, the amplification of the picture and sound I.F. carriers ahead of the second detector should be such that the sound carrier has only about 5 percent of the picture I.F. carrier amplitude by the time these carriers reach the detector. In modern receivers, the method employed for keeping the picture carrier amplitude greater than the sound I.F. carrier is to narrow the band width of the I.F. amplifier. In this way, the sound I.F. can be placed slightly past the edge of the band so as to receive only moderate amplification. In theory, this narrowing of the I.F. amplifier band width achieves the desired difference in picture carrier and sound carrier amplitudes. However, due to the proximity of the sound I.F. to the other side bands, it is often difficult in an inexpensive receiver to achieve a significant difference in amplification. Furthermore it is impractical to overcome the problem by greatly reducing the amplitude of the sound I.F. in relation to the picture carrier since the resultant loss in sound amplitude would result in low economy in the receiver due to the fact that the loss would have to be made up somewhere else in the circuit, e.g., by addition of a later amplification stage.

One method of avoiding the foregoing difficulties is to arrange the receiver circuit in such manner that the picture I.F. carrier is somehow amplified before it is heterodyned with the sound I.F., but without amplifying the sound I.F. at the same time. One arrangement of this type is shown in my prior Pat. No. 2,937,232 issued May 17, 1960 for "Intercarrier Television Receiver." In said prior Pat. No. 2,937,232, a system is shown wherein a 25.75 mc. picture I.F. carrier and a 21.25 mc. sound I.F. carrier are extracted separately, and are then combined and rectified. These frequencies are, in current practice, 45.75 mc. and 41.25 mc. respectively, and these latter values are accordingly employed in the description, to be given, of the present invention. The arrangement of my prior patent achieves the desired alteration in ratio between the picture and sound I.F. carrier amplitudes before said carriers are heterodyned to develop the 4.5 mc. FM carrier. The higher the amplitude ratio between the picture carrier and sound carrier, the less will be the amplitude modulation on the resultant 4.5 mc. sound carrier when the picture carrier is highly amplitude modulated, and the less will be the buzz mentioned previously.

The present invention represents an improvement in the type of system contemplated by my prior Pat. No. 2,937,232 arranged to reduce the amplitude modulation on the sound carrier even further.

SUMMARY OF THE INVENTION

In accordance with the present invention, the ratio between the picture and sound I.F. carriers is changed by appropriate means, e.g., by an arrangement similar to that shown in my prior Pat. No. 2,937,232. In addition to this changing of ratio, the two carriers are applied to a mixer stage such as, for example, a multiple control grid tube or multiple control element transistor. By using such a mixer stage, an additional factor is introduced to effect reduction of the undesired amplitude modulation on the sound signal. This additional reduction is achieved by making use of the nonlinearity or limiting effect of the mixer stage control elements; and the improved sound carrier is taken from the mixer stage for immediate application to the FM sound discriminator. As a practical matter, this improvement is achieved without increasing the number of stages in the receiver since it is customary to precede the FM sound discriminator by an amplifier stage. In accordance with the present invention, this normally present amplifier is simply replaced by a mixer stage which also amplifies, so that the improved signal is supplied to the FM discriminator at an amplitude similar to that of prior circuits.

BRIEF DESCRIPTION OF THE DRAWING

The drawing figure comprises a partial block diagram and partial schematic diagram showing one form of improved intercarrier television sound system constructed in accordance with the present invention.

DESCRIPTION OF THE PREFERRED EMBODIMENTS

In accordance with the present invention, an intercarrier television receiver may comprise RF amplifier 10, converter 11, and an I.F. amplifier 12 each of which may be of conventional configuration. The output of I.F. amplifier 12 is applied to a detector 13 and, after detection, the resultant amplitude modulated picture signal is applied to a video amplifier 14 through any conventional form of peaking circuit. The amplified video signals are then applied in known manner to a picture tube 15 for picture display purposes.

In addition to the foregoing, a small capacitor 16, having a capacity in the order of 3 mmf., is disposed in parallel with detector 13, between the output of I.F. amplifier 12 and video amplifier 14 for bridging a small amount of the I.F. signals to the grid of said video amplifier 14. In this way, some of the I.F. voltage will also be amplified by video amplifier 14 and will appear in the plate circuit of said amplifier 14. It is important that the amplitude of the I.F. signal applied to amplifier 14 be at least one order of magnitude lower than the video signal applied to said amplifier 14, so as to avoid any appreciable disturbing effect on the amplification of the video signals.

The plate circuit of video amplifier 14 has, in addition to the usual plate resistor and peaking coils, some means for extracting the picture I.F. carrier frequency which, in the present case, is assumed to be 45.75 mc. The video amplifier is otherwise of conventional configuration. Any conventional method may be employed to extract the picture I.F. carrier frequency from the video amplifier plate circuit, including the use of an inductor or transformer located directly adjacent to the video amplifier plate. The particular means shown in the drawing for accomplishing this purpose comprises a transformer 17 located at the plate of video amplifier 14, and having a capacitor 18 shunting the transformer secondary winding thereby to tune the transformer 17 to the picture I.F. carrier frequency, 45.75 mc. This form of energy takeoff has the advantage of being able to supply the 45.75 mc. signal in the same polarity or phase to a control element 19 in mixer stage 20 (to be described) as the picture I.F. carrier which is still present on the sound carrier and is applied to a grid or control element 21 of said mixer stage.

More particularly, the 45.75 mc. potential is built up by tuned transformer 18. One side of said tuned transformer is connected to control element 19 in mixer stage 20; and the other side of said tuned transformer is coupled via line 22 to an RC circuit 23 disposed in the cathode circuit of mixer stage 20. By this arrangement, the bias between grid 19 and the cathode of mixer stage 20 is proportioned to the magnitude of the picture I.F. carrier as well as to the characteristics of tube 20. As will appear hereinafter, this assures that if the picture I.F. signal applied to grid 19 has some amplitude modulation on it, a portion of the wave applied to grid 19 will cause grid 19 to draw grid current thereby lowering the Q of the tuned circuit coupled to grid 19, causing the grid to operate in a nonlinear fashion.

In addition to the foregoing, a low capacity condenser 24 couples energy from the output of I.F. amplifier 12 to a variable inductor 25; and said elements 24 and 25 cooperate with the interelectrode capacitance 26 between the grid 21 and the cathode of mixer stage 20 to form a circuit which is resonant at the sound I.F. frequency of 41.25 mc. By this arrangement, therefore, the sound I.F. carrier is applied to grid 21 of mixer stage 20 without significant amplification, at the same time that the amplified picture I.F. carrier is applied to grid 19 of said mixer stage 20.

The plate circuit of mixer stage 20 includes a transformer 27 which is tuned to the 4.5 mc. intercarrier sound frequency modulated by the audio signal. The output of transformer 27 is handled in conventional manner, and feeds a discriminator 28 the output of which is amplified in audio amplifier 29 and then applied to a speaker 30.

The receiver operates in its normal manner to reproduce a picture. However the sound reproduction system has a number of changes in it. While both I.F. carriers are amplified by amplifier 12, only the 41.25 mc. frequency modulated sound carrier is applied directly to a resonant circuit and then to one of the control elements (21) of the mixer stage. A portion of the I.F. signal is applied through capacitor 16 to the video amplifier 14 so that it is further amplified; and, after amplification, the 45.75 mc. picture carrier is extracted by a resonant circuit and then applied to control element 19 of the mixer stage 20. This control element 19 is biased so as to limit the amplitude variations on the 45.75 mc. signal. If desired, the control element 21 associated with the sound I.F. signal can also be used as a limiter.

As a result of the mixing of the two frequencies in stage 20, their beat frequency will appear in the plate circuit of stage 20 in conventional fashion. This 4.5 mc. beat frequency has its own resonant circuit and is applied to a discriminator and audio amplifier in conventional manner.

The addition of the mixer stage results in less amplitude modulation of the 4.5 mc. sound carrier due in part to the nonlinear characteristics of the mixer. More particularly, the shape of the I.F. voltage wave applied to the grid of a vacuum tube is reproduced fairly well across the plate impedance of said tube up to the point where the grid starts drawing grid current; and past this point, the Q of the resonant circuit driving the grid drops rapidly since the grid current represents a load on that resonant circuit. By using the bias arrangement for mixer 20 already described, any amplitude modulation on the I.F. voltage applied to grid 19 tends to produce such grid current with a consequent dropping in the amplitude of the waves. This same action occurs to some extent in respect to the signal applied to grid 21. The resultant reduction in amplitude modulation of the I.F. voltage waves, due to the mixer operation described, is augmented by the nonlinearity of the grid voltage-plate current characteristic of stage 20, a characteristic which in itself is well known.

The reduction in amplitude modulation is further enhanced through use of an arrangement of the type described, since the 45.75 mc. carrier may be amplified to a magnitude significantly larger than that of the 41.25 mc. carrier, so as to improve even further the limiting action of the mixer stage.

Notwithstanding the reduction in amplitude modulation of the 4.5 mc. sound carrier effected by all of these factors, however, the amplitude of the 4.5 mc. signal is about the same as occurs when a conventional amplifier limiter is used ahead of the discriminator 28. The improvement contemplated by the present invention therefore does not involve any increase in the number of receiver stages employed, but merely requires a change in the nature and functioning of the stage immediately preceding the discriminator. By using an amplifying type of mixer stage at this point, the control electrodes of which are operated in a non-linear fashion, a significant reduction is achieved in the amplitude variations on the resultant FM carrier.

While the foregoing description has referred to the use of vacuum tubes, it will be appreciated by those skilled in the art that all of the functions described can be accomplished in similar fashion by the use of transistors or analogous solid state amplifying elements.

While I have thus described a preferred embodiment of the present invention, many variations will be suggested to those skilled in the art. The foregoing description is therefore intended to be illustrative only and not limitative of my invention; and all such variations and modifications as are in accord with the principles described are meant to fall within the scope of the appended claims.

Having thus described my invention, I claim:

1. In an intercarrier television receiver, circuit means for producing a frequency modulated I.F. sound carrier signal and an amplitude modulated I.F. picture carrier signal, I.F. amplifier means for simultaneously amplifying both of said I.F. carrier signals, separating means coupled to the output of said I.F. amplifier means for separating said I.F. sound carrier signal from said I.F. picture carrier signal, a mixer stage having at least two control electrodes and an output electrode, means coupling said separated amplitude modulated I.F. picture carrier signal to one of said control electrodes, means coupling said separated frequency modulated I.F. sound carrier signal to another of said control electrodes, circuit means coupled to said mixer stage output electrode for deriving a frequency modulated sound carrier signal corresponding in carrier frequency to the beat frequency between the I.F. signals applied to said two control electrodes, and means for reducing amplitude modulations in said frequency modulated sound carrier signal comprising bias means coupled to said mixer stage for causing at least said one control electrode to operate in a non-linear fashion for at least a portion of the amplitude modulated picture carrier signal applied to said one control electrode.

2. The receiver of claim 1 wherein said separating means includes means for additionally amplifying said I.F. picture carrier signal prior to application of said I.F. picture carrier signal to said one control electrode.

3. The receiver of claim 1 wherein said separating means includes a first tuned circuit coupled to the output of said I.F. amplifier and tuned to the carrier frequency of said I.F. sound carrier signal, further amplifier means coupled to the output of said I.F. amplifier means, and a second tuned circuit coupled to the output of said further amplifier means and tuned to the carrier frequency of said I.F. picture carrier signal.

4. The receiver of claim 3 wherein said further amplifier means comprises a video amplifier, video detector means between the output of said I.F. amplifier and the input of said video amplifier, and impedance means in shunt with said detector means for passing a portion of the I.F. signal output of said I.F. amplifier means to the input of said video amplifier for amplification by said video amplifier along with the video signal output of said detector means.

5. The receiver of claim 4 wherein said impedance means comprises a coupling capacitor having a parameter value selected to limit the I.F. signal applied to the input of said video amplifier to an amplitude at least one order of magnitude lower than the amplitude of the video signal which is applied to the input of said video amplifier.

6. The receiver of claim 1 wherein said circuit means includes a tuned circuit coupled to said mixer stage output electrode and tuned to said beat frequency, and means coupling signals developed in said tuned circuit to a frequency discriminator.

7. The receiver of claim 1 wherein said mixer stage comprises a multi-grid vacuum tube, said separated I.F. picture and sound carrier signals being coupled respectively to different grids in said vacuum tube.

8. The receiver of claim 7 wherein the cathode of said vacuum tube includes a resistor in series therewith, said separated I.F. picture carrier signal being applied between one grid in said vacuum tube and a tap point on said cathode resistor.

References Cited

UNITED STATES PATENTS 2,901,536 8/1959 Thomas et al.
3,360,604 12/1967 Hansen.

RICHARD MURRAY, Primary Examiner

D. E. STOUT, Assistant Examiner